US012574369B2

(12) United States Patent (10) Patent No.: US 12,574,369 B2

Ansari (45) Date of Patent: Mar. 10, 2026

(54) MULTI-LAYERED SECURE AUTHENTICATION PROTOCOL FOR SECURING DIGITAL TRANSACTIONS

(71) Applicant: Khizar Ahmed Ansari, Ahmedabad (IN)

(72) Inventor: Khizar Ahmed Ansari, Ahmedabad (IN)

( * ) Notice: Subject to any disclaimer, the term of this patent is extended or adjusted under 35 U.S.C. 154(b) by 43 days.

(21) Appl. No.: 18/585,106

(22) Filed: Feb. 23, 2024

(65) Prior Publication Data

US 2025/0112913 A1 Apr. 3, 2025

Related U.S. Application Data

(60) Provisional application No. 63/541,859, filed on Oct. 1, 2023.

(51) Int. Cl.
*H04L 9/40* (2022.01)
(52) U.S. Cl.
CPC ................................. *H04L 63/0838* (2013.01)
(58) Field of Classification Search
None
See application file for complete search history.

(56) References Cited

U.S. PATENT DOCUMENTS 8,412,928 B1 * 4/2013 Bowness ............. H04L 63/0838
713/155
8,832,807 B1 * 9/2014 Kuo ........................ G06F 21/41
726/8

10,250,594 B2 * 4/2019 Chathoth ............ H04L 63/0807
2009/0205036 A1 * 8/2009 Slaton ..................... H04L 63/08
726/26
2013/0132731 A1 * 5/2013 Ruan ..................... H04L 9/3066
713/184
2013/0139222 A1 * 5/2013 Kirillin ................... H04L 67/02
726/4

(Continued)

*Primary Examiner* — Kaveh Abrishamkar

(74) *Attorney, Agent, or Firm* — Prakash Nama; Global IP Services, PLLC

(57) ABSTRACT

The invention relates to a multi-layered authentication system and method for securing transactions over a network. In one embodiment, the system includes a user device, a server comprises an application server, an authentication server, a communication network. For any transaction initiation, in response to an authentication request of the user device, the authentication server performs an authentication of the user device based on user identifier, wherein the authentication comprises a generation phase, a transmission phase and a verification phase. The generation phase includes generation of at least one User Interface (UI) elements, the UI element includes one or more one-time passwords (OTPs), where the transmission phase include transmission of the primary one-time password (POTP) and the secondary one-time password (SOTP) in a single or multiple transmission channels. And, in the verification phase causes the user device to seek confirmation from the user to grant access or authenticate a transaction by presenting a tertiary one-time password (TOTP), where the tertiary one-time password (TOTP) is a combination or overlaid of indiscernible noisy User Interface Element having the primary one-time password (POTP) and the secondary one-time password (SOTP).

13 Claims, 10 Drawing Sheets

(56)            References Cited

U.S. PATENT DOCUMENTS

2013/0227677 A1*   8/2013   Pal ........................ H04L 63/105
                                                    726/19
2014/0282964 A1*   9/2014   Stubblefield ............ H04L 63/20
                                                    726/7
2017/0279795 A1*   9/2017   Redberg .............. H04L 63/0861
2018/0247483 A1*   8/2018   Lindsay ................ G07F 7/1008
2019/0296913 A1*   9/2019   Verma ................. H04L 63/0838

* cited by examiner

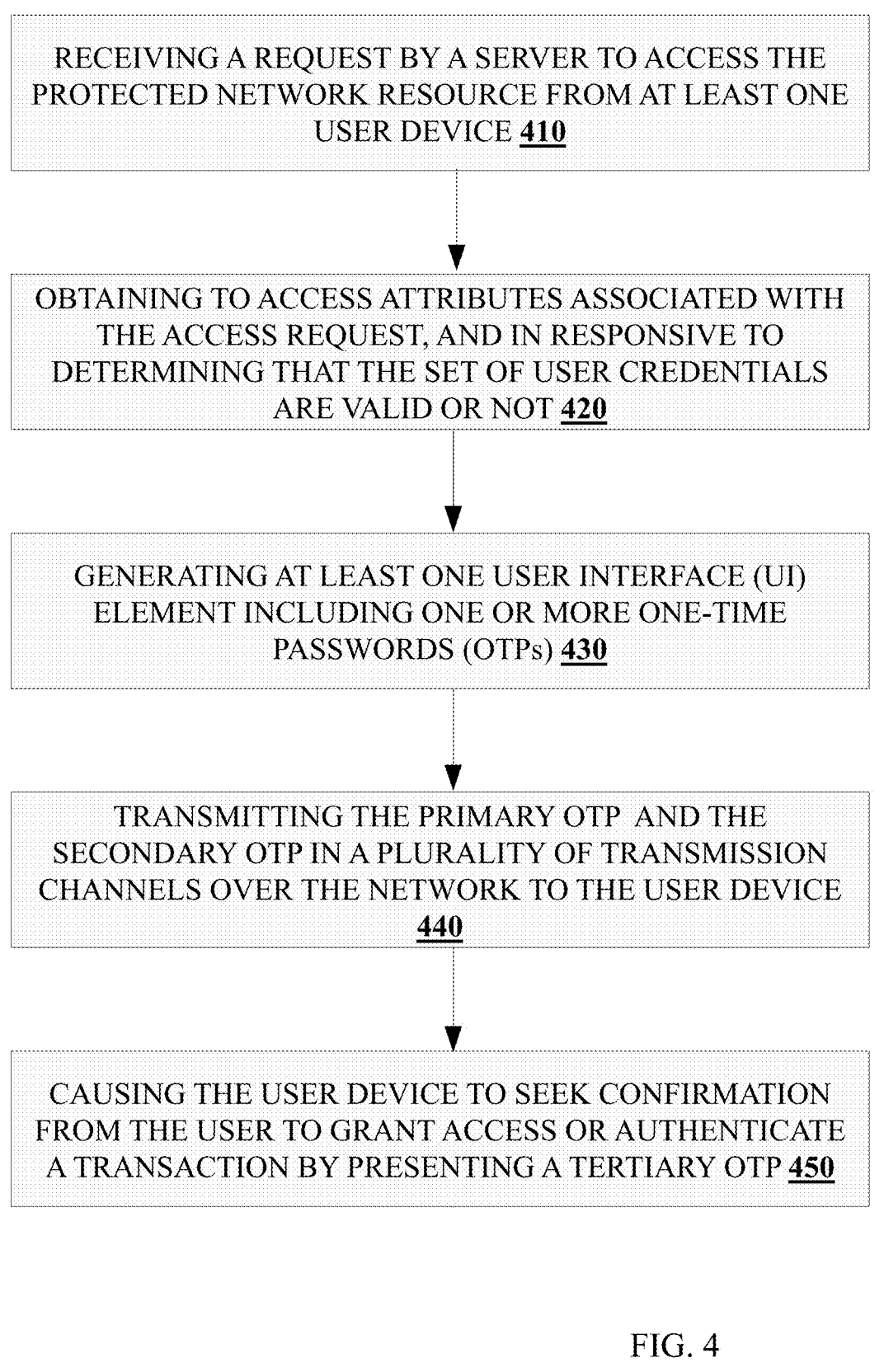

RECEIVING A REQUEST BY A SERVER TO ACCESS THE PROTECTED NETWORK RESOURCE FROM AT LEAST ONE USER DEVICE 410

OBTAINING TO ACCESS ATTRIBUTES ASSOCIATED WITH THE ACCESS REQUEST, AND IN RESPONSIVE TO DETERMINING THAT THE SET OF USER CREDENTIALS ARE VALID OR NOT 420

GENERATING AT LEAST ONE USER INTERFACE (UI) ELEMENT INCLUDING ONE OR MORE ONE-TIME PASSWORDS (OTPs) 430

TRANSMITTING THE PRIMARY OTP AND THE SECONDARY OTP IN A PLURALITY OF TRANSMISSION CHANNELS OVER THE NETWORK TO THE USER DEVICE 440

CAUSING THE USER DEVICE TO SEEK CONFIRMATION FROM THE USER TO GRANT ACCESS OR AUTHENTICATE A TRANSACTION BY PRESENTING A TERTIARY OTP 450

FIG. 4

MULTI LAYERED SECURITY 610

GRAPHICAL OTPs 620

NOISE BASED IMAGES 630

TRANSMISSION VIA MULTIPLE CHANNELS 640

MULTI-LAYERED SECURE AUTHENTICATION PROTOCOL FOR SECURING DIGITAL TRANSACTIONS

This non-provisional application claims priority from the U.S. Provisional Application No. 63/541,859 dated Jan. 10, 2023.

FIELD OF THE INVENTION

The present invention relates generally in the field of one-time passwords (OTPs), and particularly to a secured user authentication process, and more particularly to a multi-layered authentication protocol designed to enhance user experience and security in the digital transaction space.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The internet has grown in popularity enormously over the last few years. In addition to the entertainment and information aspect, commercial activity on the internet has grown rapidly over the same period. Commercial activity on the internet usually involves a transaction for buying or selling goods and/or services. Such a transaction often involves transfer of money and/or sensitive personal information to consummate the transaction, e.g., passwords, bank account numbers, etc. Due to such exchange of money and/or sensitive personal information, the internet presents a lucrative opportunity for criminals who may defraud people of their money and/or sensitive information by remaining largely anonymous and in many cases transparent to the users. As a result, instances of fraud associated with such transactions are also increasing.

Static, or fixed, passwords for authenticating human users to computer systems are known. In a static password authentication system, the password is generally a string of alphanumeric characters. The character string is often sufficiently short that the human user will easily memorize it. In some cases, the character string is so long that the human user writes it down for future reference. In either case, a static password generally does not change from one authentication instance to the next authentication instance. Each time the user is required to be authenticated; he or she will enter the same character string. The static character string will change on occasion. For example, some computer systems force the user to change the static password every three months. As a further example, in some systems, the human user is required to change her static password when a reset condition arises, such as when the password is forgotten, or security is breached. Nevertheless, as can be seen from these examples, static passwords remain relatively constant from session to session.

One-time passwords (or OTPs) are well known in the art which is a user authentication method that uses random one-time passwords generated randomly. It was introduced to overcome security vulnerability caused by repeated use of the same password. OTPs avoid several shortcomings that are associated with static passwords as mentioned above. For example, in contrast to static passwords, an OTP is generally not vulnerable to "replay attacks." This means that a potential intruder who manages to record an OTP used to access a service or to conduct a transaction will not be able to reuse, or "replay," the OTP for fraudulent authentication, because the OTP generally changes with each use.

For better understanding, the One Time Password (OTP) refers to a password that can only be used once. Conventional OTP technology involves two interactive terminals, one is the client on the user side and the other is the server on the non-user side. The client and server have a shared secret key. The client executes the process of generating the OTP to be verified, and the server executes the process of verifying the OTP to be verified. The types of OTP include S/Key OTPs, challenge-response OTPs, and time-synchronized passwords.

The problem of static password-based user authentication and two-factor authentication (2FA) or multi-factor authentication (MFA) mechanisms, which use multiple components (e.g., something that the user knows, something that the user possesses (e.g., a bank card, a key, a Universal Serial Bus (USB) stick containing a secret token or other physical object) and/or something that is inseparable from the user (e.g., fingerprint, eye iris, voice, typing speed, key press patterns and/or other biometrics or characteristics of the user)) to confirm the identity of the user.

Further, an example of challenge-response protocol includes a Completely Automated Public Turing test to tell Computers and Humans Apart (CAPTCHA) code authentication, where the challenge includes identifying a distorted CAPTCHA code and a valid response includes identifying the text included in the CAPTCHA code. However, automated techniques for deciphering a CAPTCHA have been developed, and therefore the ability of achieving a secure transaction by means of a captcha is significantly limited.

The time-synchronized passwords are implemented using time in generating an OTP. When a user generates a client-side OTP using a Personal Identification Number (PIN), a user's password and a secret key, and transmits the generated client-side OTP to an authentication server, the authentication server generates a server-side OTP using user authentication information that matches a client ID and checks whether the generated server-side OTP coincides with the received client-side OTP.

The time-synchronized password requires the authentication server and the user to enter the identical time as an input value of an OTP. Accordingly, if there is a time mismatch between an authentication server token and a user token, a user authentication can only fail. However, it is actually not easy to synchronize time between each user terminal and a server at all times due to operating environment may have a delay in an OTP authentication request and a delay in transmission between a client and an authentication server.

Common problems with existing solutions for user authentication include security, ease of use, privacy, and deployment issues. For instance, with OTP-based two-factor user authentication, users face two main issues, namely security and ease of use. OTP based two-factor authentication is not very easy to use, especially when the software-based OTP generator is present on the same device (e.g., a smartphone) that is attempting to access a network resource requiring user authentication. If the user authentication is being processed through a web application or a web browser, for example, the user needs to either copy the OTP from the generator application or remember the OTP, and then paste/enter the OTP manually into the web application or web browser. This may require the user to flip/switch between the OTP generator application and the web application, thereby creating usability issues. Systems requiring users to manually enter OTPs are therefore not convenient/preferred by users.

In view of the foregoing limitations/disadvantages of existing solutions, there is a need for systems and methods that facilitate a multi-layered authentication to enhance user experience and security in the digital transaction space while addressing various limitations/disadvantages.

SUMMARY OF THE INVENTION

This section is provided to introduce certain objects and aspects of the present invention in a simplified form that are further described below in the detailed description. This summary is not intended to identify the key features or the scope of the claimed subject matter.

Accordingly, one aspect of the present invention is a multi-layered authentication method for securing transactions over a network. In one embodiment, the method receives a request by a server to access the protected network resource from at least one user device, where receiving by the server includes a set of user credentials, having one or more user identifier of the user. Further, the method accesses one or more attributes associated with the access request, and in responsive to determines that the set of user credentials are valid for authentication. Further, the method generates at least one User Interface (UI) elements, the UI element includes one or more one-time passwords (OTPs), where the OTP comprises of a primary one-time password (POTP) and a secondary one-time password (SOTP). The primary one-time password (POTP) is associated with the user identifier, and a secondary one-time password (SOTP) which may be associated or dissociated primary one-time password (POTP). Furthermore, the method transmits the primary one-time password (POTP) and the secondary one-time password (SOTP) in a single or multiple transmission channels over the network to the user device. The transmission channel may be or may include a first channel and a second channel, where the primary one-time password (POTP) is transmitted the user device via the first channel and the secondary one-time password (SOTP) is transmitted to the user device via the second channel; Upon receiving the OTPs which cause the user device to seek confirmation from the user to grant access or authenticate a transaction by presenting a tertiary one-time password (TOTP). The tertiary one-time password (TOTP) is a combination or overlaid of indiscernible noisy image having the primary one-time password (POTP) and the secondary one-time password (SOTP).

In another aspect of the present invention provides a multi-layered authentication system for securing transactions over a network. The system includes a user device, a server having an application server, an authentication server operatively coupled with the application server, a communication network, where the user device, the application server and the authentication server are interconnected by the communication network. In operation, and in response to an authentication request of the user device, the authentication server performs an authentication of the user device based on user identifier, where the authentication comprises a generation phase, a transmission phase and a verification phase. The generation phase includes generation of at least one User Interface (UI) elements, the UI element includes one or more one-time passwords (OTPs), where the OTP comprises of a primary one-time password (POTP) and a secondary one-time password (SOTP), the primary one-time password (POTP) is associated with the user identifier, and second image having a secondary one-time password (SOTP) which may be associated or dissociated primary one-time password (POTP), The transmission phase include transmission of the the primary one-time password (POTP) and the secondary one-time password (SOTP) in a single or multiple transmission channels over the network to the user device, the transmission channel includes a first channel and a second channel, wherein the primary one-time password (POTP) is transmitted the user device via the first channel and the secondary one-time password (SOTP) is transmitted to the user device via the second channel. The verification phase causes the user device to seek confirmation from the user to grant access or authenticate a transaction by presenting a tertiary one-time password (TOTP), wherein the tertiary one-time password (TOTP) is a combination or overlaid of indiscernible noisy User Interface representation having the primary one-time password (POTP) and the secondary one-time password (SOTP).

The authentication techniques of the illustrative embodiments overcome one or more of the problems associated with the conventional techniques described previously, and provide improved authentication by generation and presentation, and further transmission of two or more individually indiscernible noisy User Interface Representation using independent multiple channels. These and other features and advantages of the present invention will become more readily apparent from the accompanying drawings and the following detailed description.

BRIEF DESCRIPTION OF THE DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 4 shows a flow chart of a multi-layered authentication method for securing transactions over a network, according to one embodiment of the present invention.

Figure 1:
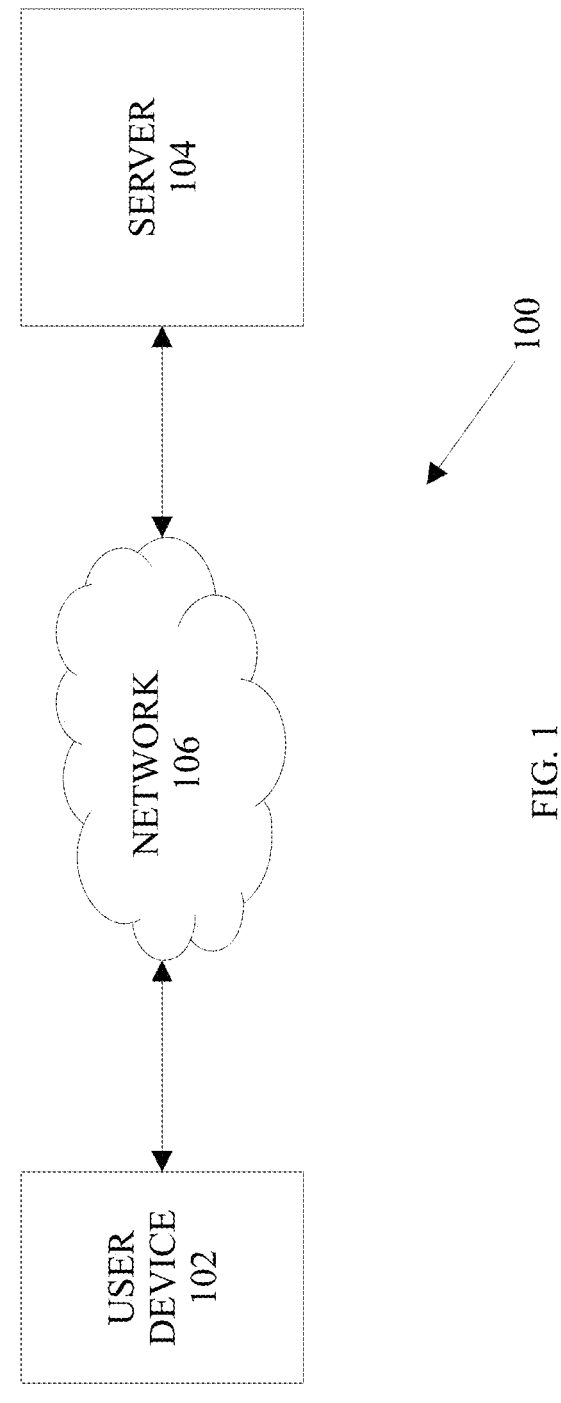
FIG. 1 illustrates an example of a system in accordance with embodiments.

The foregoing shall be more apparent from the following more detailed description of the invention.

DETAILED DESCRIPTION OF THE INVENTION

This invention facilitates various alterations and many practical examples, so that some specific cases are illustrated in the figures and the details of figures will be explained. However, it is not intended to limit this invention to a certain type of practices, but it shall be understood as aggregation of all the alteration, corresponding items or substitutes that belong to the idea and technology scope of this invention.

In the following description, for the purposes of explanation, numerous specific details are set forth to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. Various changes may be made in the function and arrangement of elements without departing from the spirit and scope of the invention as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 illustrates a schematic of an exemplary system 100, consistent with disclosed embodiments. As shown, system 100 includes a computing device 102 and a system 104 that may communicate with each other via network 106 (e.g., via the Internet). The network 106 may include one or more wireless and/or wired interconnects configured to enable communication between devices, such as the computing device 102 and the system 104. The computing device 102 is representative of any type of network-enabled computing devices, such as mobile devices, mobile phones, smartphones, tablet computers, wearable devices, laptops, portable gaming devices, and the like. Further, FIG. 1 illustrates one computing device 102; however, embodiments are not limited in this manner. In practice, system 100 may include one or more computing device 102, which can communicate with system 104. The system 104 may include one or more servers having processing circuitry (processors), memory, storage, interfaces, etc. System 104 is representative of any type of computing system, such as a server farm, workstation, computer cluster, cloud computing platform, a virtualized computing system, and the like.

Figure 2:
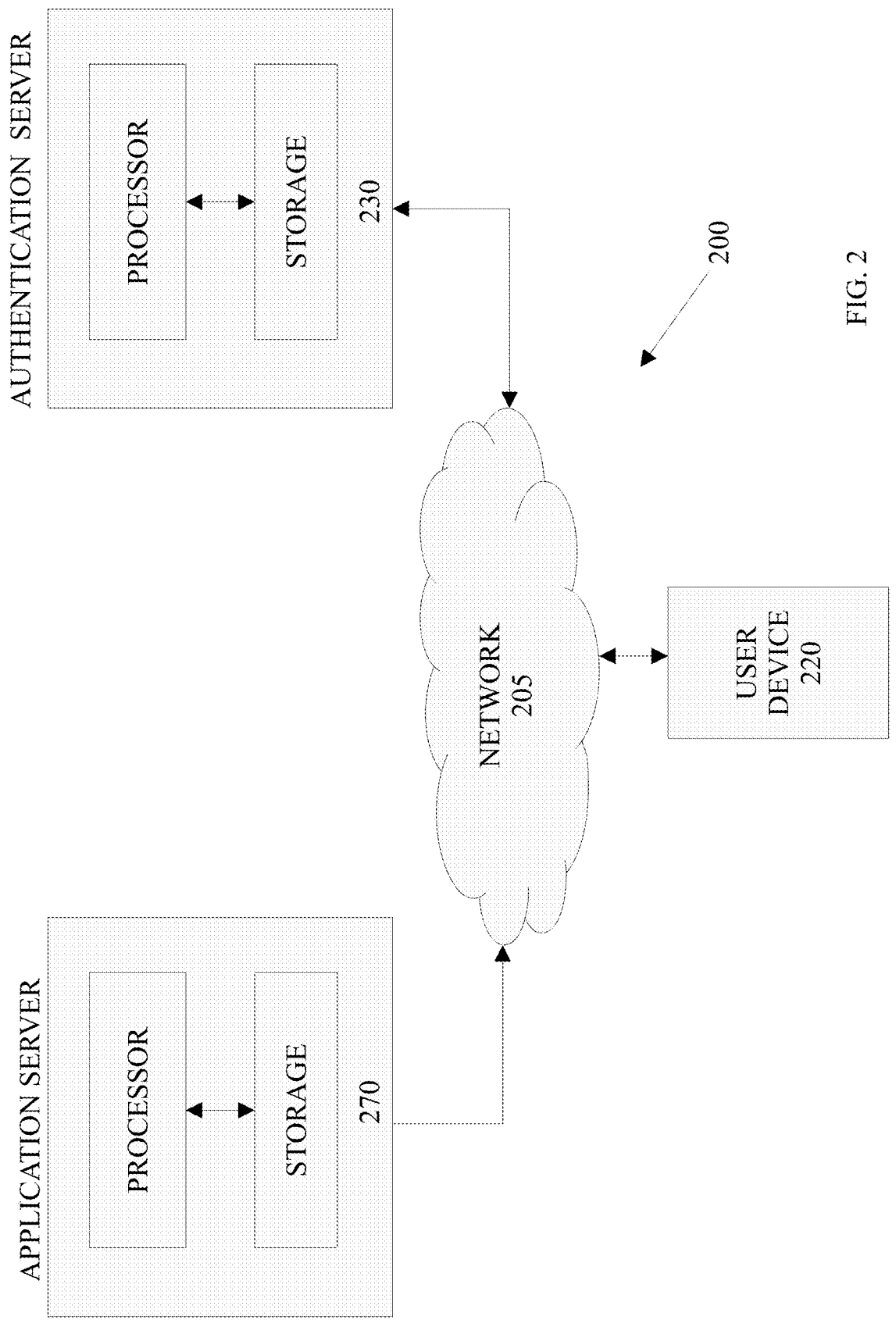
FIG. 2 shows an exemplary environment of the system of FIG. 1 which facilitates secured transaction between two parties in accordance with the embodiment of the invention.

FIG. 2 shows an exemplary environment 200. The environment, for example, facilitates secured transaction using a mobile device. The environment includes a communication network 205. The communication network may be, for example, the internet. Other types of communication networks or combination of networks may also be useful. An authentication server 230, an application server 270 and a plurality of user devices 220 are interconnected through the communication network 205. Although one user device is shown, it is understood that there may be many more user devices. As shown, the framework includes a distributed or server-client architecture. The framework may be a cloud-based platform.

A server may include one or more computers. A computer includes a memory (storage) and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component.

In the case where the server includes more than one computer, they are connected through a communication network such as an internet, intranet, local area network (LAN), wide area network (WAN), internet or a combination thereof. The servers, for example, may be part of the same private network. The servers may be located in single or multiple locations. Other configurations of servers may also be useful. For example, the servers may form a cloud.

As for user devices, they may be any type of computing devices. A computing device, for example, includes a local memory and a processor. The computing device may further include a display. The display may serve as an input and output component of the user device. In some cases, a keyboard or pad may be included to serve as an input device. The memory may be volatile or non-volatile types of non-transitory computer-readable media such as magnetic media, optical media, RAM, ROM, removable media, or any other suitable memory component. Various types of processing devices may serve as user devices. For example, the user devices may include personal computers, laptops, tablets, mobile devices, such as smart phones, and/or IoT devices. Other types of user devices may also be useful.

A user may connect to a server using a user device. The user device may be referred to as the user side while the server may be referred to as the server side. A user may access the server by logging in the user's respective account with, for example, a password using a user device. The user device may have an application interface or user interface (UI) which is used to communicate with the server. Alternatively, a web browser on the user device may be used. Other techniques for accessing the server may also be useful.

A transaction may be conducted between two parties. A first party may be a user, which may be a subscriber, an account holder or a customer, and a second party may be a service provider or vendor. Other types of parties for first and second parties may also be useful. Services may refer to any type of services provided by a second party and a first party may be any type of user which desires the service provided by the second party. In one embodiment, the first party conducts a secured transaction with the second party. A transaction may be any kind of transaction related to the service provided by the second party. A transaction may be an on-line transaction over, for example, the Internet. A transaction may also include other types of transactions, such as a transaction using a connection over other types of networks (a non-online transaction). As examples, transactions may include banking or financial transactions, sales transactions as well as other types of transactions, including member transactions. Transactions may also include other types of transactions, such as transactions using remote access connections, data exchange connections, email connections, document sharing, IoT transactions, as well as other types of transactions. The environment, for example, may be applied to any type of interactions or transactions between any two parties in which strong authentication is desired.

In one embodiment, the application server provides services of the second party. The application server may include an application (server App) which is designed to provide its services. A user may access the application server through a user device to obtain the services provided by the second party. The user device may include a user application (user App) which interacts with the server App to conduct a transaction between the first and second party. The user App, for example, may be a native App, a hybrid App or a web App which is configured to conduct the transaction with the server App. In some cases, the server App may include different configurations, including for different operating systems, to provide flexibility for the user to interact with the server App.

As for the authentication server, it facilitates a secured transaction between the first and second parties. For example, the authentication server facilitates transactions between the user App on the first party user device and server App on the second party application server. In one embodiment, the authentication server includes an authentication security App (AS App) which interacts with the user App and server App to facilitate secured transactions using One-Time Transaction Authorization Technology (OTTAT).

As described, the authentication server and application server are separate servers. It is understood that the authentication server and application server may be on the same server network. In some embodiments, the authentication server and application server may be part of a cloud service. In some other embodiments, the authentication server may be a separate service provided by an authentication service provider. Other configurations of the servers may also be useful.

Figure 3:
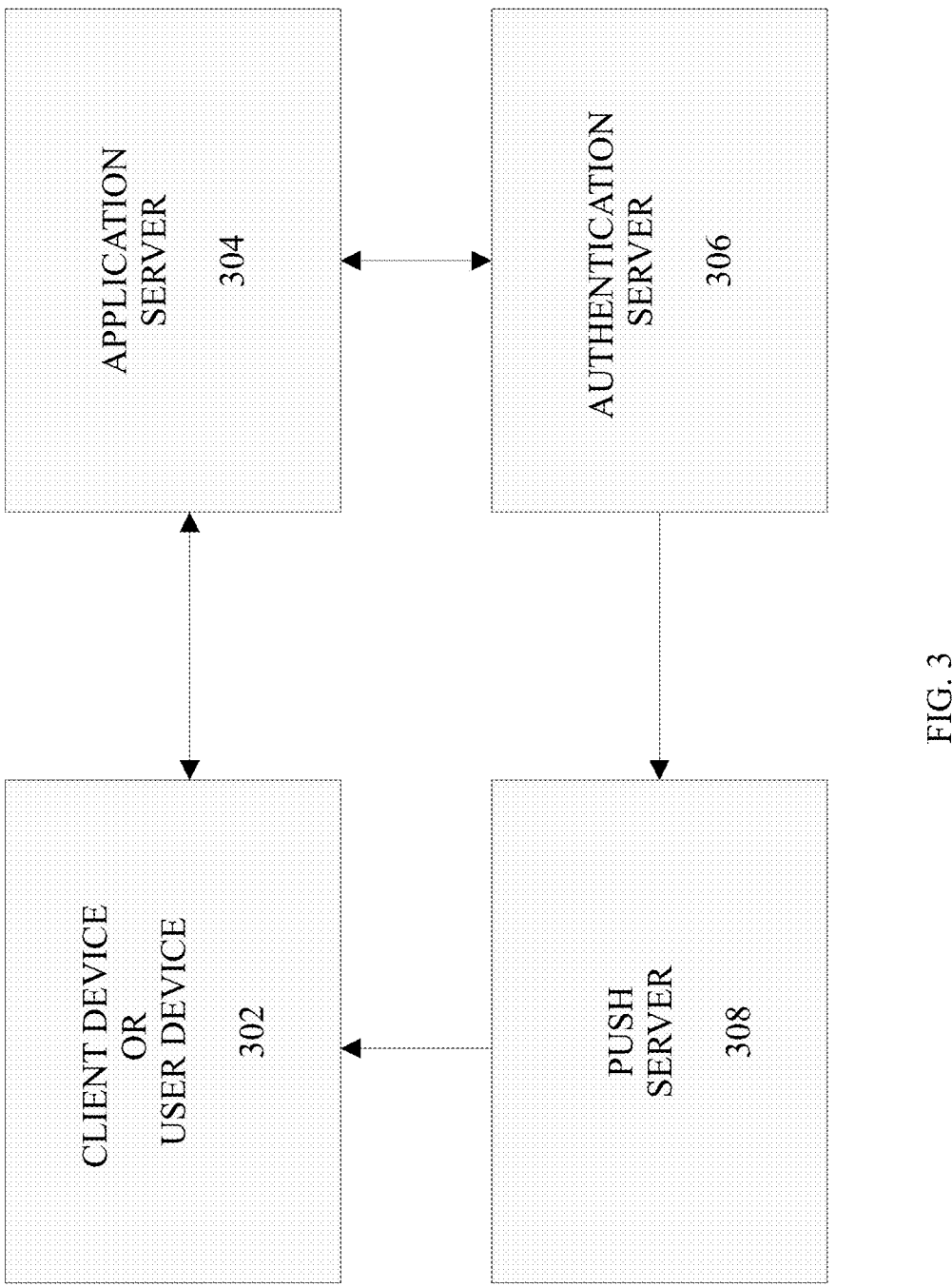
FIG. 3 shows a block diagram illustrating a configuration of an authentication server according to an exemplary embodiment.

Referring to FIG. 3 which shows a block diagram showing an exemplary workflow of OTP generation in accordance with an embodiment of the present invention. As shown in FIG. 3, a user device 302 can send an access request along with a set of user credentials to an application server 304. Application server 304 can determine access attributes associated with the access request and validate the set of user credentials. Application server 304 can then send at least a part of the user credentials (e.g., the user identifier) along with or without the access attributes to an authentication server 306. A notification may be sent to the user device to cause the user of client device 302 to verify the access request. User device 302 can display the content of the push notification from a push server (308) on a screen of client device 302 and prompt the user to confirm he/she initiated the access request associated with the displayed access attributes by verifying himself/herself. Further, the authentication includes a generation phase, a transmission phase and a verification phase. The generation phase includes generation of at least one User Interface (UI) elements, the UI element includes one or more one-time passwords (OTPs), where the OTP comprises of a primary one-time password (POTP) and a secondary one-time password (SOTP), the primary one-time password (POTP) is associated with the user identifier, and second UI Element having a secondary one-time password (SOTP) which may be associated or dissociated primary one-time password (POTP). In an example embodiment, the UI elements may be or may include but not limited to an image, one or more images, a text or one or more text, a numeral value or one or more numeral value or a combination of shapes.

The transmission phase include transmission of the the primary one-time password (POTP) and the secondary one-time password (SOTP) in a single or multiple transmission channels over the network to the user device, the transmission channel includes a first channel and a second channel, where the primary one-time password (POTP) is transmitted the user device via the first channel and the secondary one-time password (SOTP) is transmitted to the user device via the second channel. And, in the verification phase causes the user device to seek confirmation from the user to grant access or authenticate a transaction by presenting a tertiary one-time password (TOTP), where the tertiary one-time password (TOTP) is a combination or overlaid of indiscernible noisy User Interface Element having the primary one-time password (POTP) and the secondary one-time password (SOTP).

As can be seen in FIG. 3, client device 302 and application server 304 can be connected through a bidirectional connection through a private or public network, and similarly application server 304 and authentication server 306 can be connected through a bidirectional connection via the private or public network. In an exemplary implementation, authentication server 306 and the push server 308 can be connected through a unidirectional connection, and similarly the push server 308 and client device 302 can be connected through a unidirectional connection.

Referring to FIG. 4 which shows a flow chart of a multi-layered authentication method for securing transactions over a network, according to one embodiment of the present invention.

At step 410, the method receives a request by a server to access the protected network resource from at least one user device. The user device may be or may include a mobile phone, a smart watch, a smart phone, a tablet computer, a desktop computer, or a laptop computer. The step of receiving by the server may include a set of user credentials, having at least a user identifier of the user. The set of user credentials comprises the user identifier and a password corresponding to the user identifier.

At step 420, the method obtains access attributes associated with the access request, and in responsive to determining that the set of user credentials are valid for authentication. The access attributes include a time associated with the access request and a device identifier associated with the user device. At step 430, the method generates at least one User Interface (UI) element, the UI element includes one or more one-time passwords (OTPs), where the OTP comprises of a primary one-time password (POTP) and a secondary one-time password (SOTP). The primary one-time password (POTP) is associated with the user identifier, and a secondary one-time password (SOTP) which may be associated or dissociated primary one-time password (POTP). In an embodiment, the secondary one-time passwords (OTPs) are randomly generated.

At step 440, the method transmits the primary one-time password (POTP) and the secondary one-time password (SOTP) in a single or multiple transmission channels over the network to the user device, the transmission channel includes a first channel and a second channel. The primary one-time password (POTP) is transmitted the user device via the first channel and the secondary one-time password (SOTP) is transmitted to the user device via the second channel. In an example embodiment, the primary one-time password (POTP) transmitted to the user device via the first channel is a Transmission Control Protocol (TCP), and the secondary one-time password (SOTP) is transmitted to the user device via the second channel is User Datagram Protocol (UDP). In an example embodiment, the first and the second transmission channel may be or may include any other network communication or security protocol but not limiting to Remote Desktop Protocol (RDP), Secure Sockets Layer (SSL), etc. In another example embodiment of the present invention, where the transmission of POTP and SOTP may be in a single channel in a successive session of transmission in a pre-defined or random time intervals. The channels referred above for example may utilize different protocols such as Transmission Control Protocol (TCP) for the first channel and User Datagram Protocol (UDP) for the second channel. However, it's important to note that the method remains channel-agnostic, which can accommodate various communication channels and is not limited to specific protocols or technologies for transmitting the one-time passwords.

At step 450, the method causes the user device to seek confirmation from the user to grant access or authenticate a transaction by presenting a tertiary one-time password (TOTP), where the tertiary one-time password (TOTP) is a combination or overlaid of indiscernible noisy image having the primary one-time password (POTP) and the secondary one-time password (SOTP). In an example embodiment, the tertiary one-time password (TOTP) is provided to the user for selection having a plurality of OTPs of which one of the OTP is the correct OTP with coordinates, and upon selection sends the choice back to the server for verification. The user authenticates a transaction by clicking on the co-ordinates of the correct OTP, wherein the clicking of the OTP co-ordinates is based on the grid system or pixel co-ordinates. In another example embodiment of the invention, the tertiary one-time password (TOTP) characteristics includes random lines or shapes as noise to prevent the primary one-time password (POTP) from bots or OCR application to avoid fraudulent activities or unauthorized access. In another example embodiment, the primary OTP (POTP) can be partially shared and partially merged with secondary OTP (SOTP), by merging POTP and SOTP a tertiary OTP (TOTP) on User Interface Element can be presented.

Figure 5A:
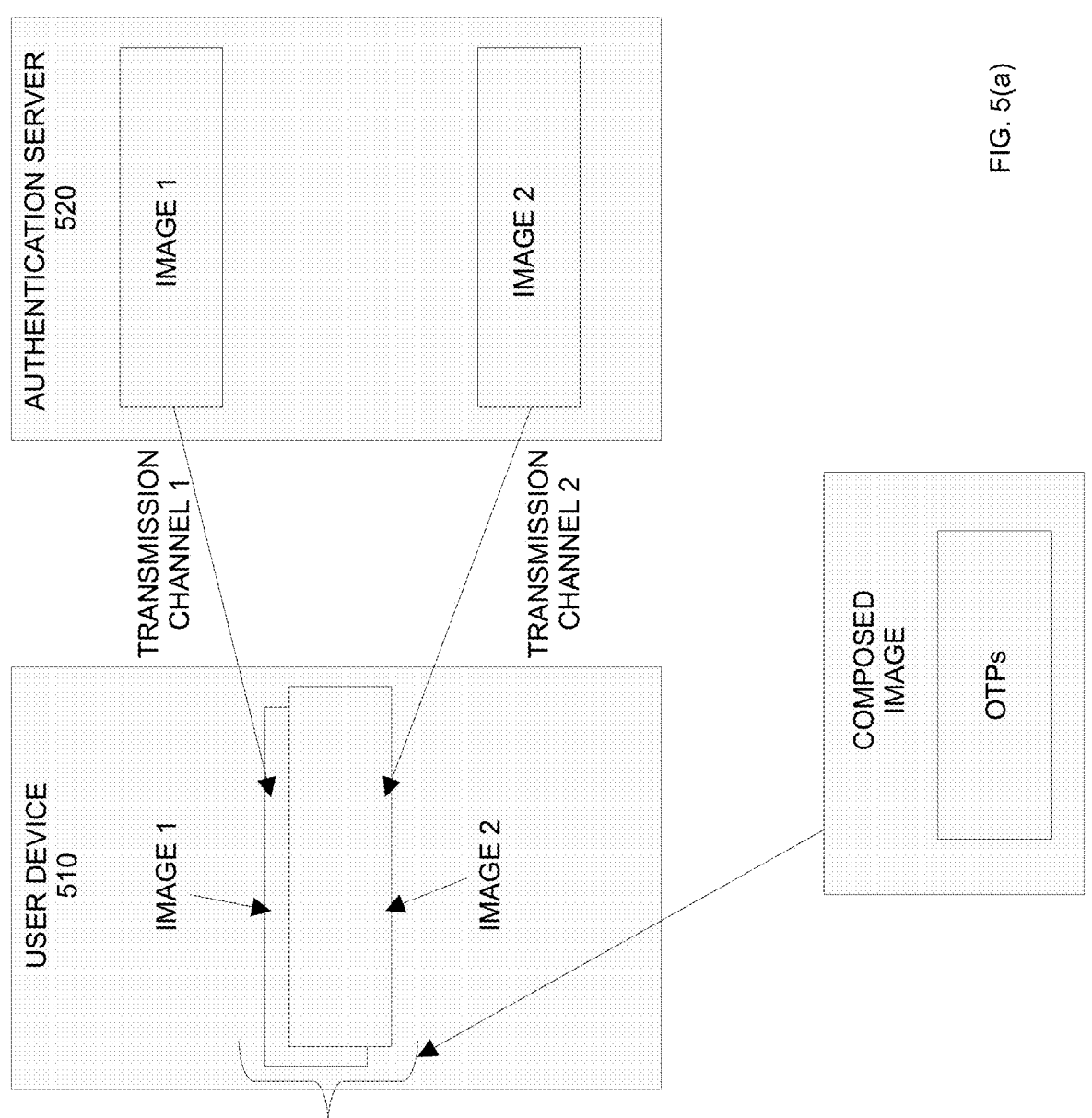
FIGS. 5(a) and 5(b) shows examples of image composition and transmission.
Figure 5B:
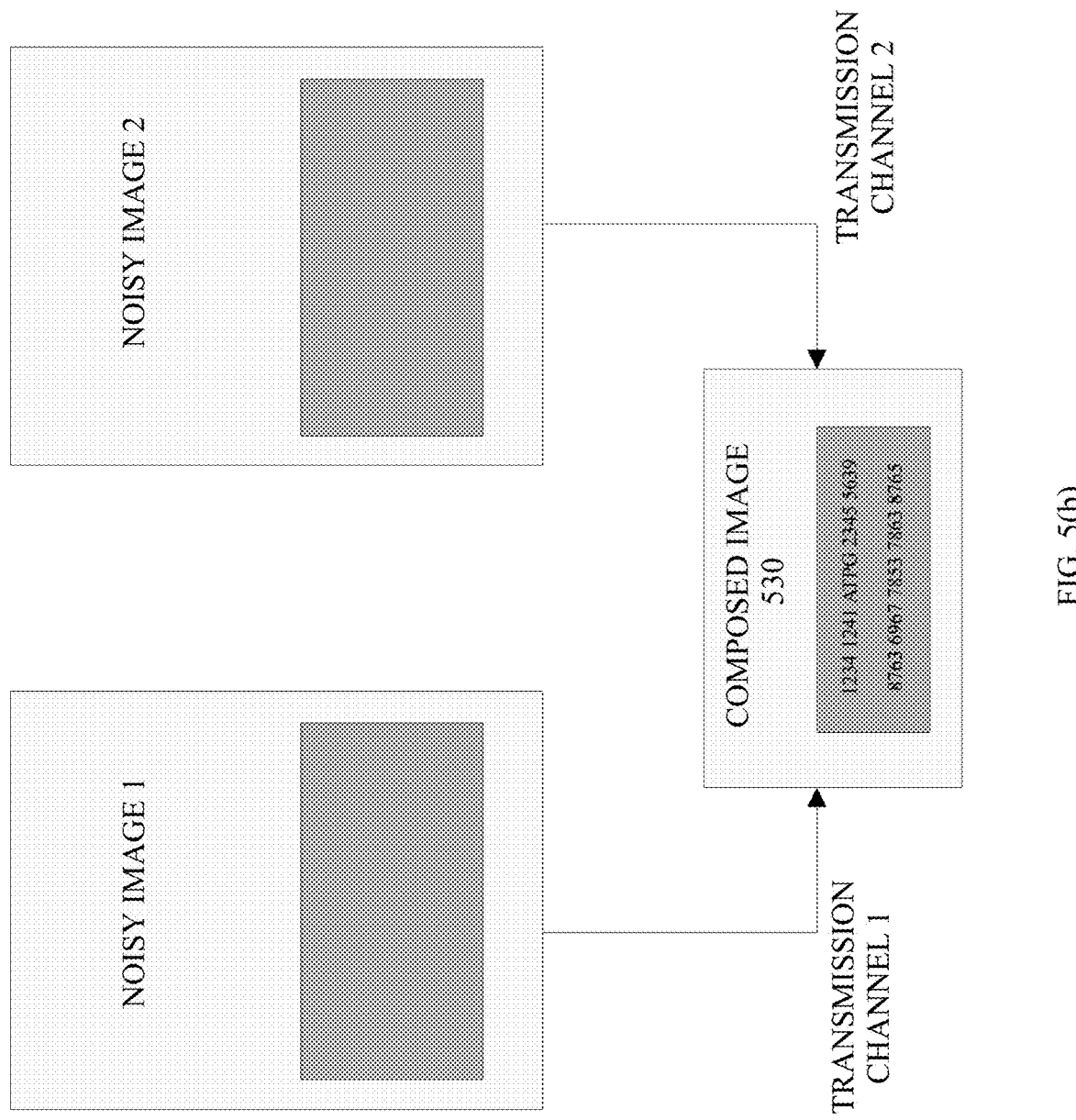

Referring to FIGS. 5(*a*) and 5(*b*) which show examples of primary and secondary OTP and transmission according to one embodiment of the present invention. As shown in 5(*a*), the user device 510 and the authentication server 520. As an example, embodiment, the user authentication server 520 which generates two OTPs. In this example, OTPs as images i.e., image 1 and image 2, where image 1 is transmitted via the transmission channel 1 and the image 2 is transmitted via the transmission channel 2. The transmission channel 1 is a TCP and the transmission channel 2 is a UDP. The transmitted images i.e., 1 and 2 are superimposed to one another and form a composed image including OTPs. The composed image contains discernible OTPs when image 1 and image 2 are overlaid or combined. FIG. 5(*b*) shows an example of a composed image 530 in accordance with one embodiment of the present invention.

Figure 6:
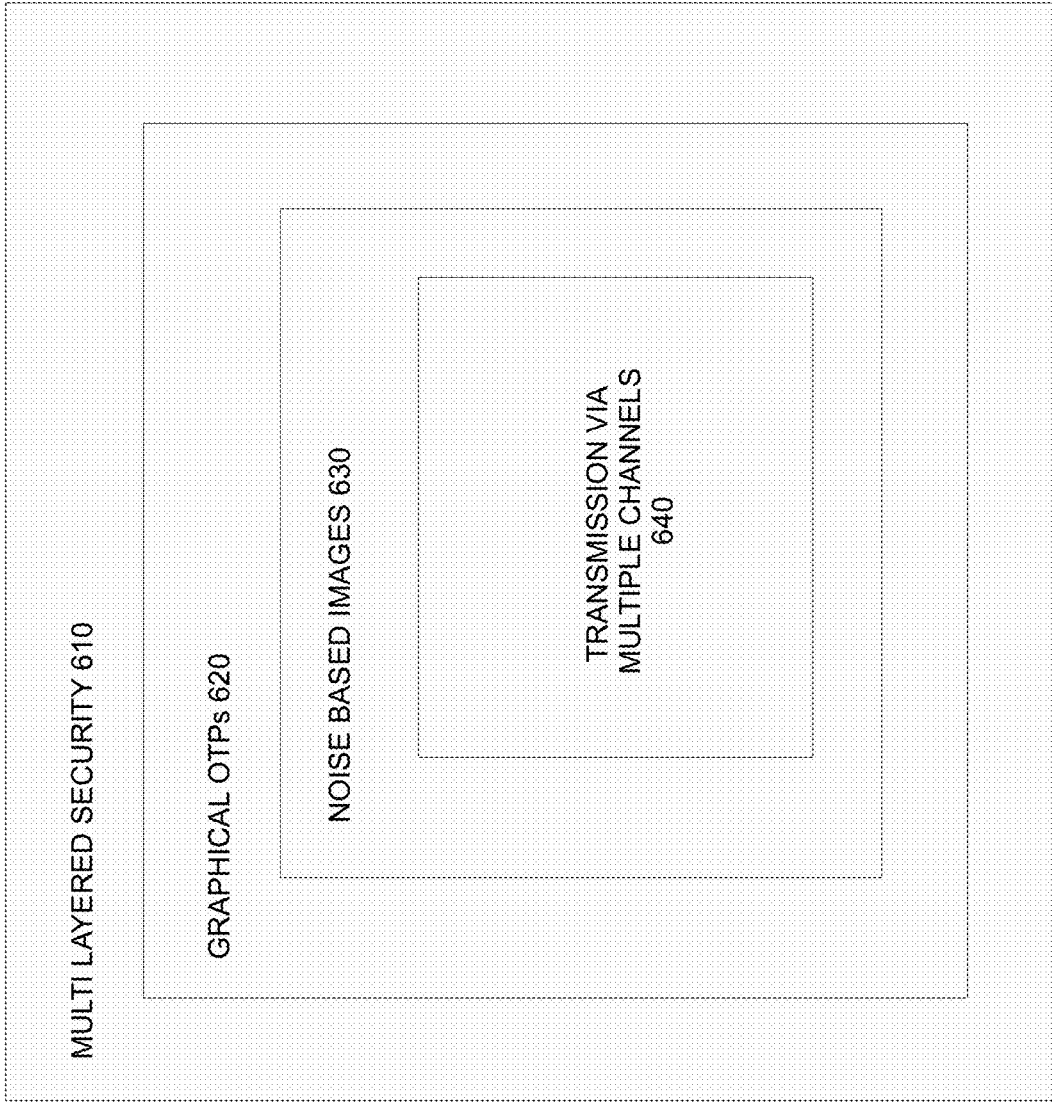
FIG. 6 shows a high level security layer diagram, according to example embodiment of the present invention.

Referring to FIG. 6 which shows a high level security layer diagram. The security layer diagram shows various layers including a multi-layer security 610, a graphical OTPs 620, noise based OTPs e.g. images 630 and a transmission via multiple channels 640. The multi-layered security represents the overall security provided by the system. The graphical OTPs represent the layer where OTPs are visual and graphical, which may increase the security as they are harder to intercept. The Noise based images represent the layer where images with noise are used, making it difficult to discern information without overlaying. And moreover, transmission via TCP and UDP represents the layer where dual transmission pathways are used to ensure secure and reliable delivery of images.

Figure 7:
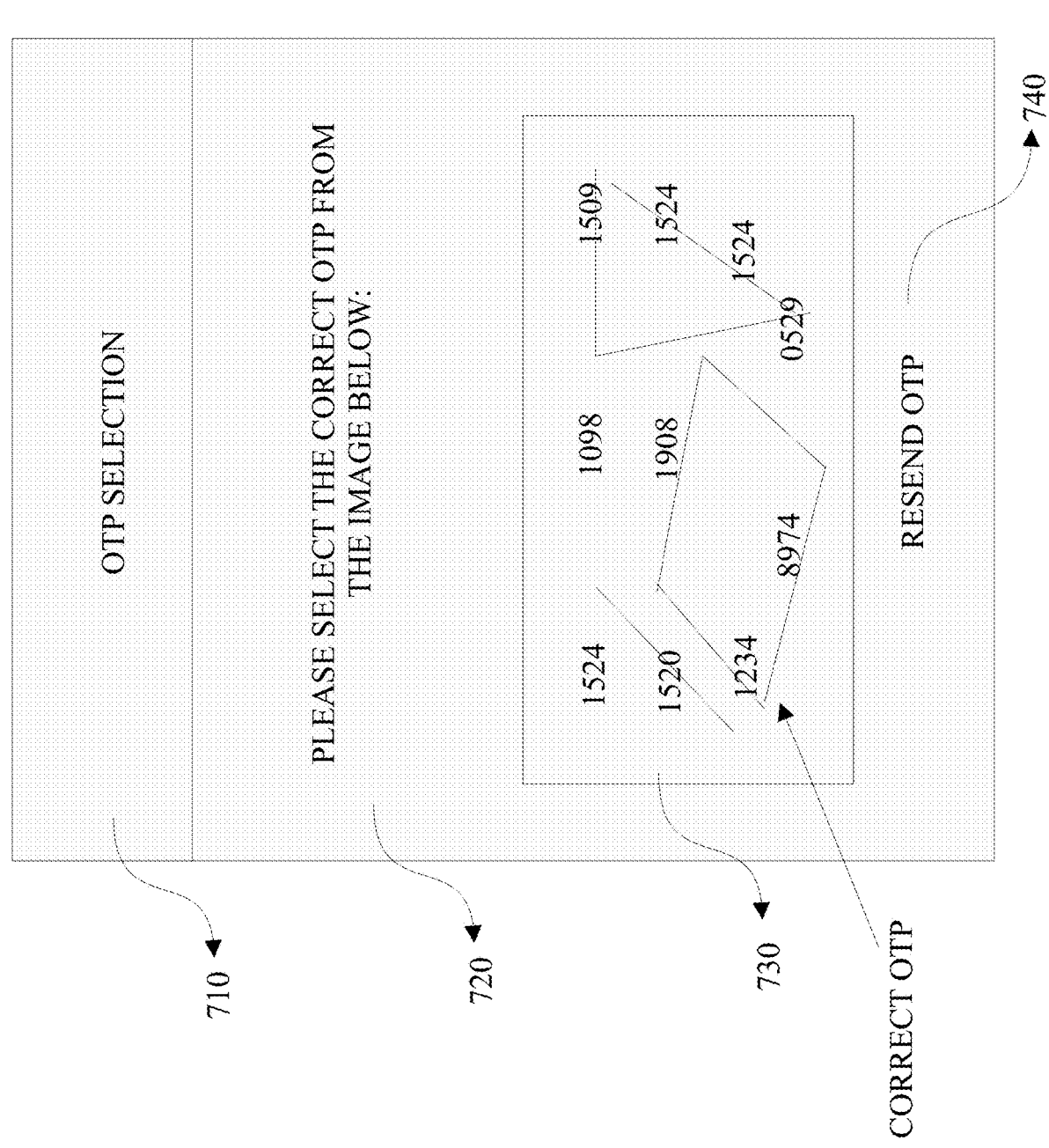
FIG. 7 shows an OTP selection interface, according to example embodiment of the present invention.

Referring to FIG. 7 which shows an OTP selection interface including collated image as an example embodiment with one or more one-time passwords. As shown, the interface includes a title bar 710, instruction text 720, image with OTPs 730 and resend button 740. The title bar displays the title "OTP selection" indicating to the user that this is the step where they select the correct OTP from the displayed options. The instruction text is positioned below the title bar, where a simple instruction tells the user to select the correct OTP from the image below, providing clear guidance on what the user is expected to do. Further, image with OTPs, which is the main part of the interface which is occupied by an image with OTPs. In an example embodiment, the OTPs are randomly placed with additional noise in the form of lines, shapes, or distortions to deter OCR software's and bots. The correction OTP (example 1234) is also randomly placed amongst the incorrect ones. Further, the resend buttons are positioned at the bottom for interaction. The "Resend OTP" button allows the user to refresh the image to get a new set of OTPs if they are unable to identify the correct one.

Figure 8:
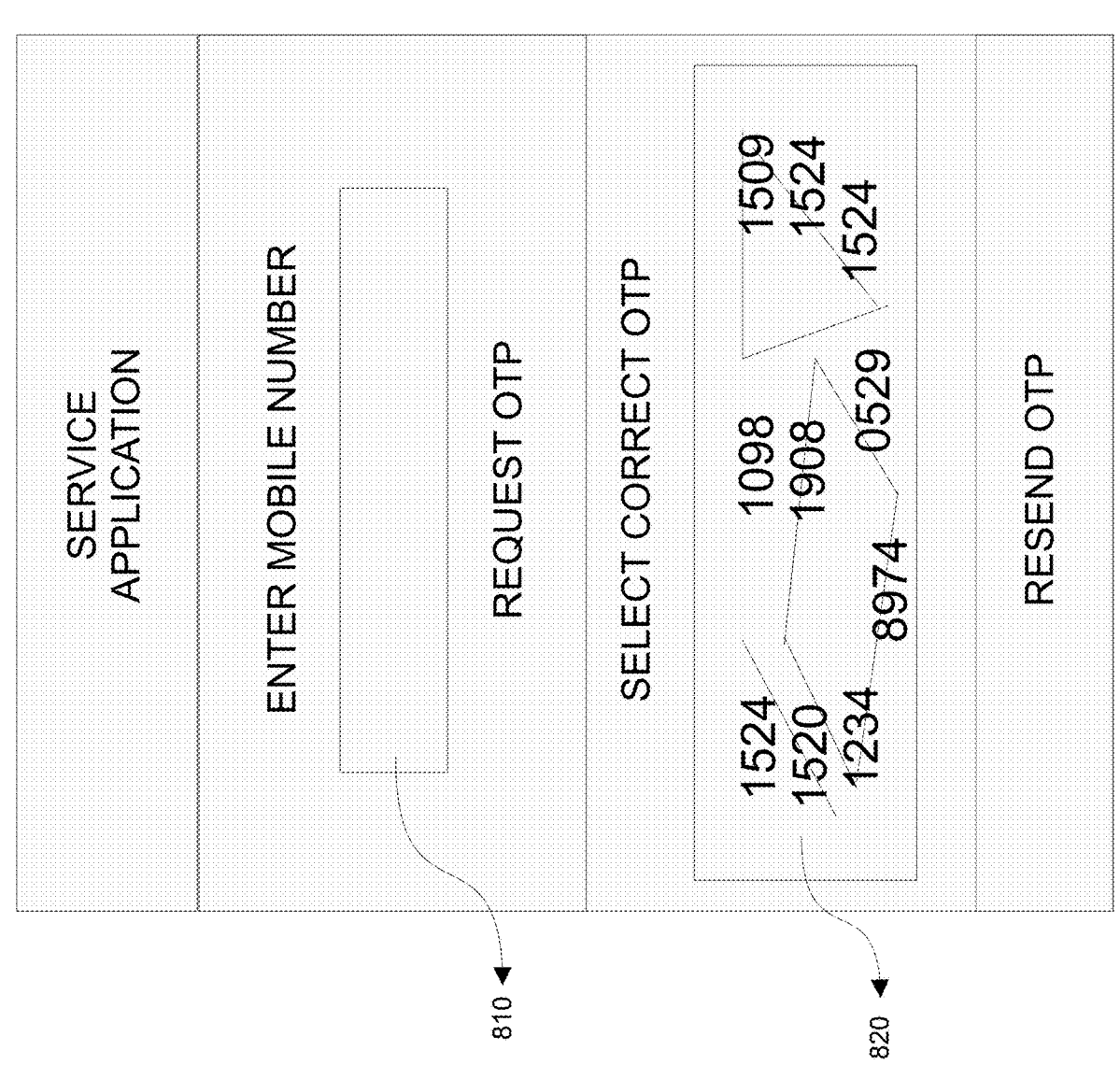
FIG. 8 shows an example of an authentication using a mobile application.

Referring to FIG. 8 which shows an example of an authentication using a mobile application. FIG. 8 shows an interface of a mobile application. The application interface has an interface layout 810, OTP presentation 820, and a User interaction section. The interface layout is the top part of the interface which allows the users to enter their mobile number and request the OTP. Below the interface part, which shows an image containing OTP options as an example embodiment, out of which one is correct. Further, the user clicks or select on correct OTP on the image. Further, the OTP are presented in image with noise, making it difficult for bots to read them. The user interaction section where user interact with the interface by entering the mobile number, requesting the OTP, selecting the correct OTP among the displayed options, and confirming their selection. In an example embodiment, the interface may be or may include the optional embellishments/alternatives where the interface could feature different layouts, button placements, OTP presentations, obscuring methods, or additional elements to enhance user interaction and security. Further, additional security features like noise and distortion can be applied to the OTP options to prevent automated readings. Moreover, the Enhancements might include user-friendly prompts, visual aids, adaptive layouts, or other elements improving usability and accessibility.

Figure 9:
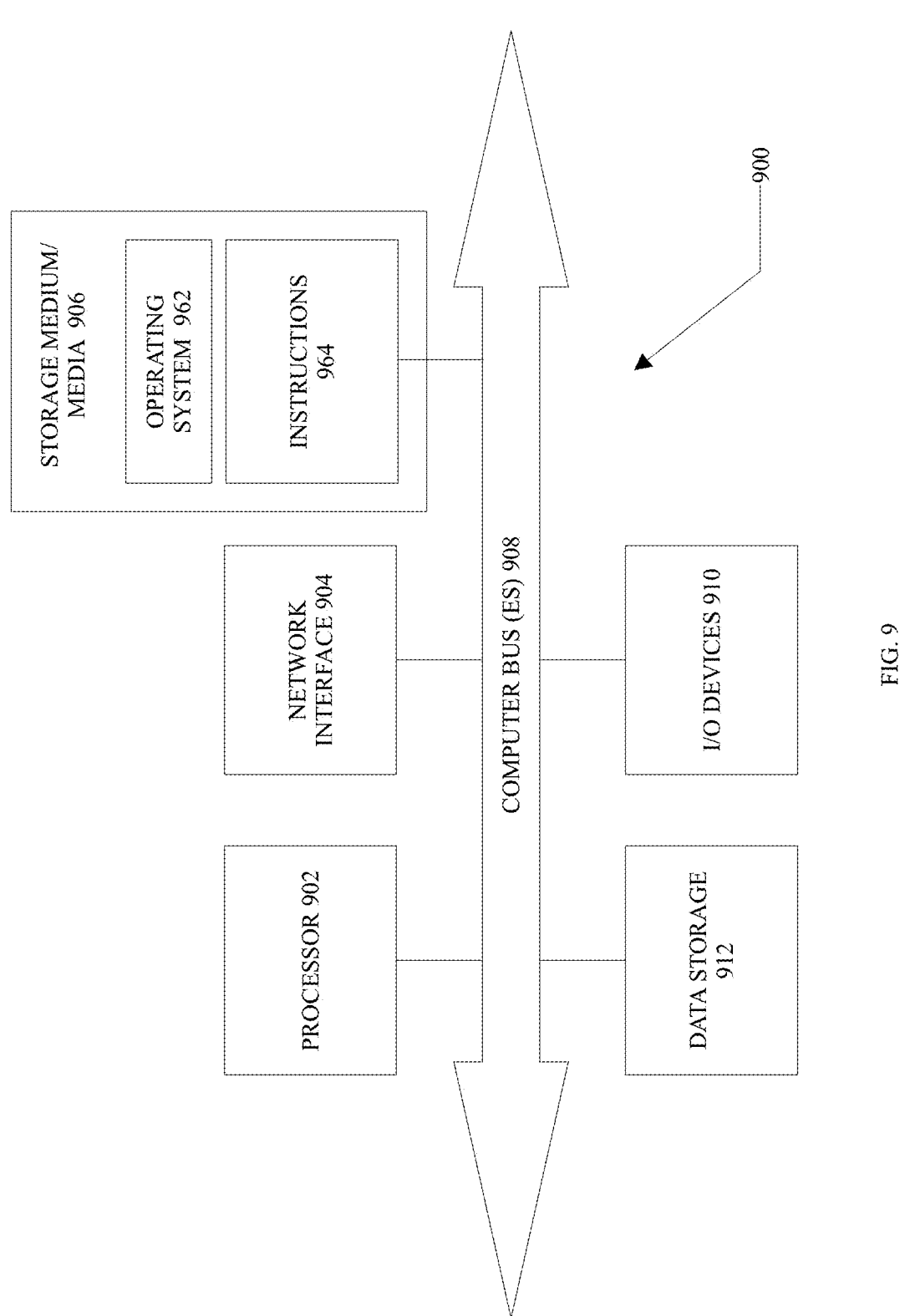
FIG. 9 illustrates a computer system that may be used to implement the applications access system in accordance with the examples disclosed herein.

FIG. 9 illustrates a computer system 900 that may be used to implement the authentication and applications access system 100 in accordance with the examples disclosed herein. More particularly, computing machines such as desktops, laptops, smartphones, tablets, and wearables which may be used to generate or access the data from the applications access system 100 may have the structure of the computer system 900. The computer system 900 may include additional components not shown and some of the process components described may be removed and/or modified. In another example, a computer system 900 can sit on external-cloud platforms such as Amazon Web Services, AZURE® cloud or internal corporate cloud computing clusters, or organizational computing resources, etc.

The computer system 900 includes processor(s) 902, such as a central processing unit, ASIC or another type of processing circuit, input/output devices 910, such as a display, mouse keyboard, etc., a network interface 904, such as a Local Area Network (LAN), a wireless 802.11x LAN, a 3G, 4G or 10G mobile WAN or a WiMAX WAN, and a processor-readable medium 906. Each of these components may be operatively coupled to a bus 908. The processor-readable or computer-readable medium 906 may be any suitable medium that participates in providing instructions to the processor(s) 902 for execution. For example, the processor-readable medium 906 may be a non-transitory or non-volatile medium, such as a magnetic disk or solid-state non-volatile memory, or a volatile medium such as RAM. The instructions or modules stored on the processor-readable medium 906 may include machine-readable instructions 964 executed by the processor(s) 902 that cause the processor(s) 902 to perform the methods and functions of the applications access system 100.

The applications access system 100 may be implemented as software or machine-readable instructions stored on a non-transitory processor-readable medium and executed by one or more processors 902. For example, the processor-readable medium 906 may store an operating system 962, such as MAC OS, MS WINDOWS, UNIX, or LINUX, and code/instructions 964 for the applications access system 100. The operating system 962 may be multi-user, multi-processing, multitasking, multithreading, real-time, and the like. For example, during runtime, the operating system 962 is running and the code for the applications access system 100 is executed by the processor(s) 902.

The computer system 900 may include a data storage 912, which may include non-volatile data storage. The data storage 912 stores any data used by the applications access system 100. The data storage 912 may be used as the data storage to store the master data and other data elements which are generated and/or used during the operation of the applications access system 100.

The network interface 904 connects the computer system 900 to internal systems, for example, via a LAN. Also, the network interface 904 may connect the computer system 900 to the Internet. For example, the computer system 900 may connect to web browsers and other external applications and systems via the network interface 904.

The foregoing description provides illustration and description but is not intended to be exhaustive or to limit the invention to the precise form disclosed. Modifications and variations are possible considering the above teachings or may be acquired from practice of the invention. For example, while a series of blocks has been described with respect to process flows, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that following. The specification and the drawing are accordingly to be regarded in an illustrative rather than restrictive sense.

The invention claimed is:

1. A multi-layered authentication method for securing transactions over a network, the method comprising:
   receiving a request by a server to access the protected network resource from at least one user device, wherein receiving by the server includes a set of user credentials, having at least a user identifier of the user;
   determining, in response to the request, that the set of user credentials are valid for authentication;
   generating, by an authentication server, at least one User Interface (UI) element including one or more one-time passwords (OTPs), wherein the OTP comprises:
   a primary one-time password (POTP) associated with the user identifier, and
   a secondary one-time password (SOTP) randomly generated and independent of the primary one-time password (POTP);
   transmitting the primary one-time password (POTP) and the secondary one-time password (SOTP) in a single or multiple transmission channels over the network to the user device, the transmission channel includes a first channel and a second channel, wherein the primary one-time password (POTP) is transmitted to the user device via the first channel and the secondary one-time password (SOTP) is transmitted to the user device via the second channel;

generating a tertiary one-time password (TOTP) by compositing the primary one-time password (POTP) and the secondary one-time password (SOTP) into a noisy graphical representation, and causing the user device to present the Tertiary one-time password (TOTP) to the user for confirmation, wherein the user confirms access or transaction authorization by selecting a location within the image corresponding to the correct one-time password.

2. The method of claim 1, wherein the user device comprises, but is not limited to, a mobile phone, a smart watch, a smart phone, a tablet computer, a desktop computer, a laptop computer, virtual reality (VR) headsets, augmented reality (AR) glasses, spatial computing devices, and any other types of user devices equipped with display technologies that may emerge in the future.

3. The method of claim 1, wherein the set of user credentials comprises the user identifier and a password corresponding to the user identifier.

4. The method of claim 1, wherein the access attributes include a time associated with the access request and a device identifier associated with the user device.

5. The method of claim 1, wherein the primary one-time password (POTP) transmitted to the user device via the first channel, and the secondary one-time password (SOTP) is transmitted to the user device via the second channel.

6. The method of claim 1, wherein the tertiary one-time password (TOPT) is provided to the user for selection having a plurality of OTPs of which one of the OTP is the correct OTP with coordinates, and upon selection sends the choice back to the server for verification.

7. The method of claim 1, wherein the tertiary one-time password (TOPT) characteristics includes random lines or shapes as noise to prevent the primary one-time password (POTP) from bots or OCR application to avoid fraudulent activities or unauthorized access.

8. The method of claim 1, wherein the secondary one-time passwords (SOTPs) are randomly generated.

9. The method of claim 1, wherein the user authenticates a transaction by selecting a location within the graphical representation of the tertiary one-time password (TOTP), wherein the selection is based on grid coordinates or pixel coordinates corresponding to the correct OTP embedded in the image.

10. A multi-layered authentication system for securing transactions over a network, the system comprising:

a user device comprises an application with a transaction module and a security module;

a server comprises an application server having a back-end application with a transaction module and a security module;

an authentication server operatively coupled with the application server;

a communication network, wherein the user device, the application server and the authentication server are interconnected by the communication network; and wherein, in response to an authentication request of the user device, the authentication server performs an authentication of the user device based on user identifier, wherein the authentication comprises a generation phase, a transmission phase and a verification phase, wherein the generation phase includes generation of at least one User Interface (UI) elements, the UI element includes one or more one-time passwords (OTPs), wherein the OTP comprises a primary one-time password (POTP) associated with the user identifier, and a secondary one-time password (SOTP) randomly generated and independent of the primary one-time password (POTP), wherein the transmission phase include transmitting the POTP and the SOTP via two independent communication channels of different types over the network to the user device, the communication channel including a first channel and a second channel, wherein the primary one-time password (POTP) is transmitted to the user device via the first channel and the secondary one-time password (SOTP) is transmitted to the user device via the second channel, and wherein the verification phase causes the user device to seek confirmation from the user to grant access or authenticate the transaction by presenting a tertiary one-time password (TOTP), wherein the tertiary one-time password (TOTP) is a combination or overlaid of indiscernible noisy User Interface Element Representation having the primary one-time password (POTP) and the secondary one-time password (SOTP).

11. The system of claim 10, wherein communication of the authentication between the user device and the authentication server is facilitated by the back-end security module of the application server.

12. The system of claim 10, wherein the first channel is a TCP where the primary one-time password (POTP) is transmitted to the user device, and the second channel is a UDP where the secondary one-time password (SOTP) is transmitted to the user device.

13. The system of claim 10, wherein the primary OTP (POTP) can be partially shared and partially merged with secondary OTP (SOTP), by merging POTP and SOTP a tertiary OTP (TOTP) on User Interface Element can be presented.

* * * * *